United States Patent
Myer

[11] 3,811,751
[45] May 21, 1974

[54] SELF-ILLUMINATED LIQUID CRYSTAL DISPLAY PANEL

[75] Inventor: Gary D. Myer, Canoga Park, Calif.

[73] Assignee: Hughes Aircraft Company, Culver City, Calif.

[22] Filed: Apr. 2, 1973

[21] Appl. No.: 347,304

[52] U.S. Cl. .......................................... 350/160 LC
[51] Int. Cl. ............................................... G02f 1/28
[58] Field of Search.............................. 350/160 LC

[56] References Cited
UNITED STATES PATENTS

| | | | |
|---|---|---|---|
| 3,653,138 | 4/1972 | Cooper | 350/160 LC X |
| 3,722,206 | 3/1973 | Bergey | 350/150 X |
| 3,647,958 | 3/1972 | Sobel | 350/160 R UX |
| 3,734,598 | 5/1973 | Aiken | 350/160 LC |

*Primary Examiner*—Ronald L. Wibert
*Assistant Examiner*—Paul K. Godwin
*Attorney, Agent, or Firm*—W. H. MacAllister, Jr.; J. M. May

[57] ABSTRACT

A self-illuminated liquid crystal display panel has an electroluminescent panel behind a liquid crystal layer with two layers of micro-louvered light control film sandwiched between the panel and the liquid crystal layer in order to direct the light prior to selective scattering in activated regions of the liquid crystal. The embodiments show dark information on a bright background and bright information on a dark background.

4 Claims, 3 Drawing Figures

PATENTED MAY 21 1974

SELF-ILLUMINATED LIQUID CRYSTAL DISPLAY PANEL

BACKGROUND OF THE INVENTION

This invention relates generally to liquid crystal displays and relates particularly to liquid crystal displays having an integral light source.

Liquid crystal displays operate on the principle of selectively scattering the light transmitted through "activated" regions of a liquid crystal layer provided within the display structure, while not scattering that transmitted through adjacent "non-activated" regions. Obviously, some form of light source is required. In the prior art, that light source was provided by either the ambient room lighting, particularly in the case of reflective liquid crystal displays, or in the case of transmissive liquid crystal displays, by an incandescent light bulb behind the display and off the viewing axis. Liquid crystal displays dependent on ambient light have the disadvantage of being useless at night or whenever an external light source is not readily available. Those prior art displays containing incandescent bulbs were bulky and required excessive power; furthermore, the bulbs themselves were subject to problems of vibration and shortened lifetime, among other limitations.

Accordingly, it is one object of the present invention to provide a light source integral with the liquid crystal display structure.

It is a second object of the present invention to reduce the power required in such displays.

It is a third object of the present invention to dispense with incandescent bulbs as a source of illumination in liquid crystal displays.

It is a fourth object of the present invention to reduce the bulk of integrally lighted displays.

It is a fifth object of the present invention to provide a glare-free background against which the scattering liquid crystal regions will be clearly outlined.

It is a sixth object of the present invention to provide a liquid crystal display having a high degree of contrast.

SUMMARY OF THE INVENTION

The invention which satisfies these objects may be briefly summarized as follows.

A conventional liquid crystal/transparent electrode sandwich is backed by an electroluminescent panel light source separated from the sandwich by a micro-louvered light control film, thereby effectively directing the light emitted by the electroluminescent panel and enabling the light scattered by the activated liquid crystal to be differentiated from that transmitted through the non-activated regions. An integrally lighted liquid crystal display built in accordance with the present invention is compact, rugged, and economical, while still providing a high degree of contrast to the observer.

BRIEF DESCRIPTION OF THE DRAWINGS

The invention will now be described in reference to the accompanying drawings, in which.

DETAILED DESCRIPTION

Figure 1:
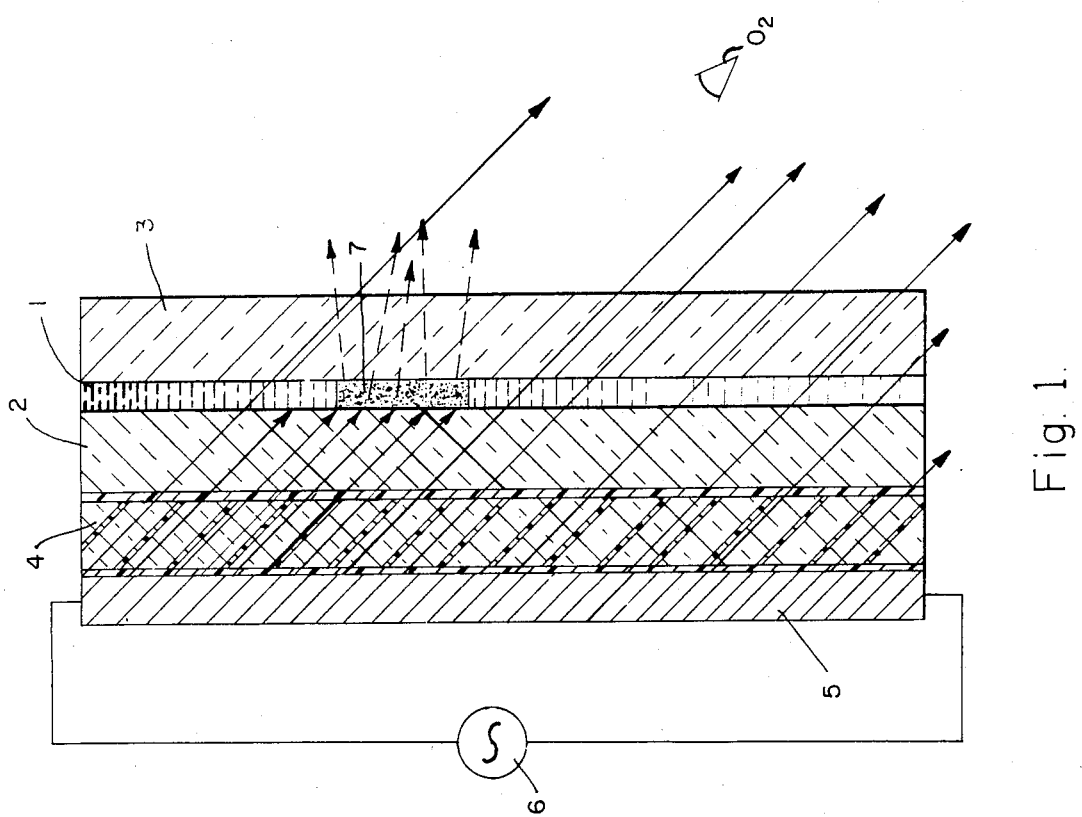
FIG. 1 shows the operation of the novel display structure (illustrated in cross section) providing a high degree of white-on-black or black-on-white contrast.

Referring now with greater particularity to FIG. 1, it may be seen that in a preferred embodiment of the present invention, the conventional liquid crystal/electrode sandwich (comprising liquid crystal layer 1 located between rear electrode 2 and front electrode 3) is in turn backed by a layer of light control film 4 and an electroluminescent panel light source 5. As is well known, electroluminescent light sources may be obtained having a thin, flat structure which is advantageously compatible with the flat structure of a liquid crystal display sandwich, thus resulting in a most compact package. Such electroluminescent panels run cooler than a conventional incandescent bulb, minimizing the adverse effects on the temperature range of the liquid crystal, and are operable with either AC or alternating DC (a source of AC current 6 being shown symbolically in FIG. 1). Their brightness may be varied in response to changes in either voltage or frequency. Electroluminescent panels can last up to ten years, depending upon what voltage and frequency is used to drive them. The light control film 4 (described in greater detail below with respect to FIG. 2) effectively directs the scattered light emitted from the electroluminescent panel 5, in the orientation plane of the micro-louvers of the light control film.

If the eye of an observer is located at the point in FIG. 1 designated $O_1$, the observer sees a dark background (the light control film directing all light emitted from the electroluminescent panel 5 at an angle away from him). However, in a region where the liquid crystal layer 1 is activated to a scattering state (such a region being designated in FIG. 1 with the reference numeral 7), the generally downwards oriented light passing through the light control film 4 is scattered by the liquid crystal 1 towards the observer $O_1$, with the result that the observer sees a bright image on a dark background.

If, however, the observer is located in the position designated in FIG. 1 as $O_2$, that is to say in the same plane as the micro-louvers of the light control film 4, then the observer will observe a generally bright, glare-free background, except in the region 7 where the light emitted from the electroluminescent panel is scattered away from the observer $O_2$, resulting in a dark image on a bright background.

Figure 2:
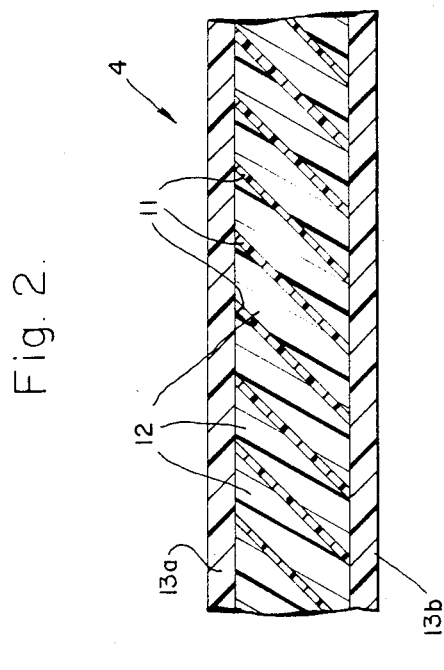
FIG. 2 is a detail of a particular type of light control film utilized in the embodiment of the invention illustrated in FIG. 1.

Referring now to FIG. 2, wherein the light control film 4 of FIG. 1 is shown in greater detail, it may be seen that the film comprises a plurality of thin (preferably black matte) micro-louvers 11 separated by relatively thick (0.010 inches) clear regions 12. Transparent cover sheets 13a and 13b provide structural rigidity for the whole assembly. Suitable light control films in thicknesses ranging from 0.015 inches to 0.030 inches are available as a standard product from the Minnesota Mining and Manufacturing Co. Although in the embodiment illustrated in FIGS. 1 and 2 the micro-louvers 11 are oriented in a plane having an angle of 45° with respect to cover sheets 13, light control film is also available with the micro-louvers at many angles with respect to the cover sheets. For the single light control film configuration of FIG. 1, the steeper the louvre angle, the wider the light-on-dark-display viewing angle.

For a more compact display package, the light control film can be silk screened, printed, or laminated onto various substrates. This means that the rear electrode could be made up with the electroluminescent panel and light control film combined.

Figure 3:
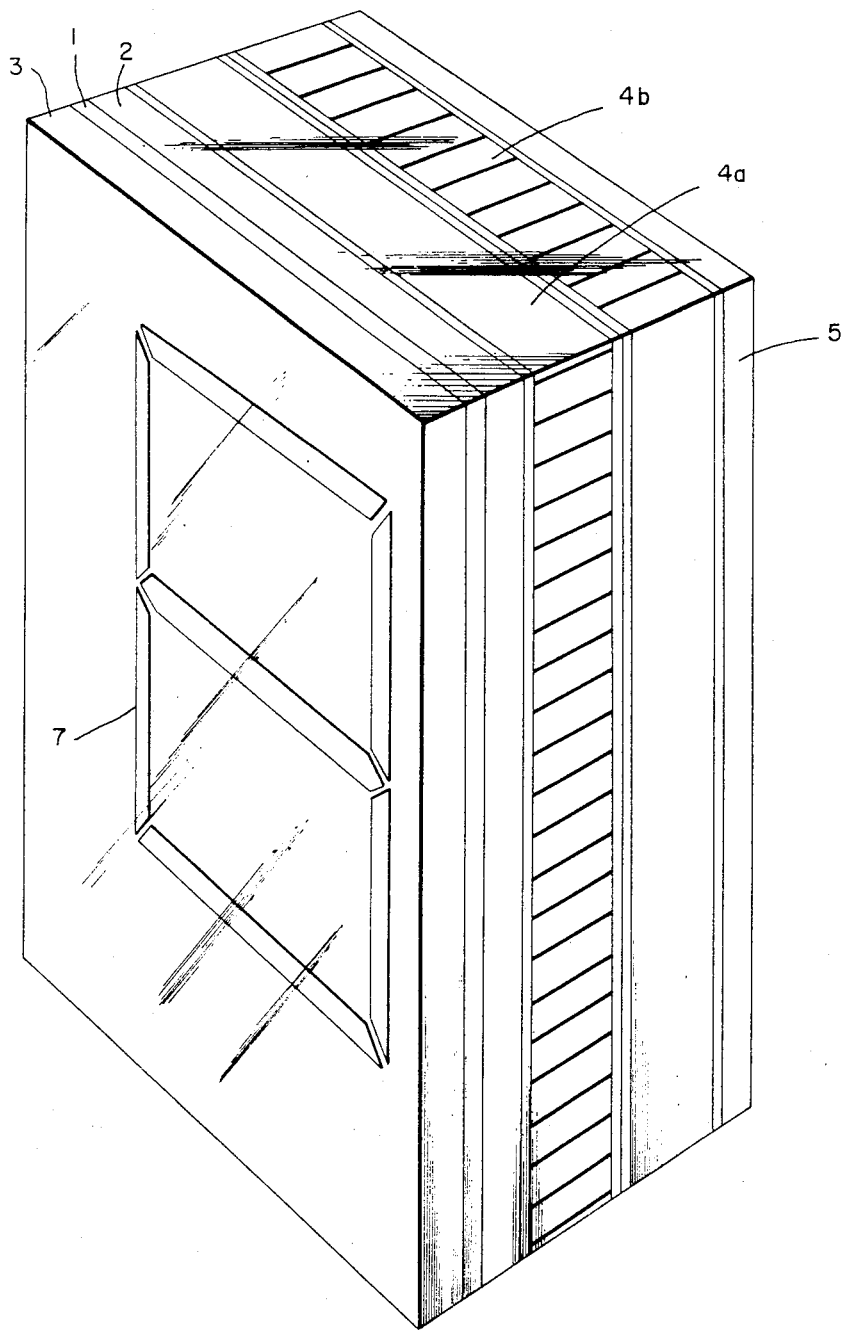
FIG. 3 shows a second embodiment of the present invention having two layers of light control film.

A second embodiment of the present invention is illustrated in FIG. 3. The single layer of light-control film 4 of the FIG. 1 embodiment is replaced by two layers of light control film 4a and 4b. The light control film 4a (FIG. 3) is rotated by 90° with respect to layer 4b, thus ensuring a higher degree of direction of the light emitted from the electroluminescent light source 5, with the result that an even higher degree of angle readability is obtained compared to the FIG. 2 embodiment. However, this wider angle is obtained at the price of a thicker and more complex display package.

Although the advantageous use of an electroluminescent panel light source has been emphasized, it should be noted that the display will also function as a conventional reflective display in the presence of sufficient ambient light. Depending upon the intended application, a partially reflecting mirror can be included as part of the rear electrode 2, and front electrode 3 may be coated with an anti-reflective coating.

What is claimed is:
1. A self-illuminated display comprising:
a layer of liquid crystal for selectively scattering light;

light source means for providing an evenly distributed source of light, said means being spaced apart from said liquid crystal layer;
a first layer of light control film sandwiched between said light source means and said liquid crystal layer, said light control film having a plurality of generally parallel micro-louvers set at an angle with respect to a face of said film for directing the light from said light source means in a first orientation plane parallel to said micro-louvers; and
a second layer of light control film also sandwiched between said light source means and said liquid crystal layer, said second layer having its micro-louvers set parallel to a second orientation plane intersecting said first orientation plane.

2. The display of claim 1 having a viewing axis intersecting both of said orientation planes, whereby a light image on a dark background is obtainable.

3. The display of claim 2 wherein said micro-louvers are set at an acute angle with respect to the face of said film and wherein said viewing axis is perpendicular to said film.

4. A self-illuminated planar display having a viewing axis intersecting said display at a predetermined angle, said display comprising:
a layer of liquid crystal;
a pair of electrodes for inducing electric current in selected portions of said liquid crystal whereby light may be selectively scattered by said liquid crystal;
an electroluminescent panel for providing an evenly distributed source of light, said panel being spaced apart from said liquid crystal layer and oriented parallel therewith;
a layer of light control film sandwiched between said electroluminescent panel and said liquid crystal layer, said light control film having a plurality of generally parallel micro-louvers set at an angle with respect to a face of said film wherein said micro-louvers are generally parallel with a first orientation plane having said viewing axis defined thereon whereby a dark image on a light background is obtainable; and
a second layer of light control film also sandwiched between said electroluminescent panel and said liquid crystal layer, said second layer having its micro-louvers set parallel to a second orientation plane intersecting about said viewing axis said first orientation plane.

* * * * *